US007317771B2

(12) United States Patent
Brunel

(10) Patent No.: US 7,317,771 B2
(45) Date of Patent: Jan. 8, 2008

(54) MIMO TELECOMMUNICATION SYSTEM WITH ACCELERATED SPHERE DECODING

(75) Inventor: Loic Brunel, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 749 days.

(21) Appl. No.: 10/442,087

(22) Filed: May 21, 2003

(65) Prior Publication Data

US 2003/0236076 A1 Dec. 25, 2003

(30) Foreign Application Priority Data

Jun. 24, 2002 (EP) ................... 02291571

(51) Int. Cl.
*H04L 1/02* (2006.01)
(52) U.S. Cl. ..................................... 375/347
(58) Field of Classification Search ............... 375/347, 375/346, 316, 377, 224
See application file for complete search history.

(56) References Cited

U.S. PATENT DOCUMENTS

2002/0044611 A1  4/2002  Hassibi et al.

OTHER PUBLICATIONS

Chan, A. et al., "A New Reduced-Complexity Sphere Decoder For Multiple Antenna Systems," IEEE International Conference on Communications, vol. 1, Apr. 28-May 2, 2002, pp. 460-464.*

Albert M. Chan, et al. "A New Reduced-Complexity Sphere Decoder for Multiple Antenna Systems" ICC 2002, 2002 IEEE International Conference on Communications, Conference Proceedings, New York, NY, Apr. 28-May 2, 2002, vol. 1 of 5, pp. 460-464.

M. Oussama Damen, et al. "Generalised Sphere Decoder for Asymmetrical Space-Time Communication Architecture" Electronics Letters, vol. 36, No. 2, Jan. 20, 2000, pp. 166-167.

Mohamed Oussama Damen, et al. "Further Results on the Sphere Decoder" Proceedings of the 2001 IEEE International Symposium on Information Theory, ISIT 2001, Washington, WA Jun. 24-Jun. 29, 2001; IEEE Internationsal Symposium on Information Theory, New York, NY: IEEE, US, Jun. 24, 2001, p. 333.

* cited by examiner

*Primary Examiner*—Pankaj Kumar
(74) *Attorney, Agent, or Firm*—Oblon, Spivak, McClelland, Maier & Neustadt, P.C.

(57) ABSTRACT

The invention concerns a method for estimating a plurality of symbols transmitted by a first plurality of transmit antennas at a given emission time or a plurality of symbols subjected to a space-time dispersion coding prior to transmission by the first plurality of transmit antennas over a second plurality of transmission times, the method using the signals received by a third plurality of receive antennas, each symbol belonging to a modulation constellation. The method includes forming a vector representative of said received signals at a reception time or at a plurality of consecutive reception times; searching the closest neighbour of said vector among candidate vectors belonging to a lattice of points generated by a plurality of generating vectors, wherein the components of said vector are reordered according to an ordering rule prior to a search.

8 Claims, 8 Drawing Sheets

MIMO TELECOMMUNICATION SYSTEM WITH ACCELERATED SPHERE DECODING

BACKGROUND OF THE INVENTION

1. Field of the Invention

The present invention relates to a wireless telecommunication system, and more particularly to a wireless telecommunication system using multiple antennas at a transmitter and multiple antennas at a receiver, also called multiple-input multiple-output (MIMO) system.

2. Discussion of the Background

MIMO telecommunication systems are well known in the prior art for their capability of achieving dramatically improved capacity as compared to single antenna to single antenna or multiple antennas to single antenna systems.

The principle of a MIMO telecommunication system has been illustrated in FIG. 1. The data stream $D_{in}$ to be transmitted is encoded at the transmitter side by a vector encoder 110 and mapped into a plurality of symbol substreams, each substream being dedicated to a given antenna. The different substreams are RF modulated and amplified by the Tx units $120_1$, $120_2$ ..., $120_M$ before being transmitted by the antennas $130_1$, $130_2$, ..., $130_M$. At the receiver side, a plurality of antennas $140_1$, $140_2$, ..., $140_N$ receive the transmitted signals and the received signals are RF demodulated into symbols by the Rx units $150_1$, $150_2$ ..., $150_N$. The symbols thus obtained are processed by a detector 160 to produce a stream of received data $D_{out}$.

Various schemes have been proposed in the prior art for the vector encoder 110 and the detector 160. The basic idea underlying these schemes is to exploit both the space diversity (due to the different fading coefficients affecting the propagation between the transmit and receive antennas) and time diversity. For this reason, the unit 110 is also called a space-time encoder. For example, a space-time diversity technique has been proposed in an article of Tarokh et al. entitled "Space-time codes for high data rates wireless communications: performance criterion and code construction" published in IEEE Trans. Inform. Theory, vol. 44, pp 744-765, March 1998. This technique, named STTC (for Space-Time Trellis Coding) creates inter-relations between transmitted signals in the space domain (different transmit antennas) and the time domain (consecutive time symbols) according to a trellis structure. The transition in the trellis are determined by the input symbols. The detector 160 is based on a Maximum Likelihood Sequence Estimation (MLSE), computing the lowest accumulated metric to determine the most likely transmitted sequence. Another space-time diversity technique has been proposed by S. M. Alamouti et al. in an article entitled "A simple transmit diversity technique for wireless communications" published in IEEE J. Select. Areas. Comm., vol. 16, pp 1451-1458, October 1998. According to this technique, called STBC (for Space-Time Block Coding), a block of input symbols is mapped into a L×M coded matrix where L is a number of consecutive time slots and the L vectors constituting said matrix are transmitted by the M transmit antennas.

More recently, it has been shown by O. Damen et al. in an article entitled "Lattice code decoder for space-time codes" published in IEEE Communication Letters, vol. 4, n°5, pp 161-163, May 2000, that the signal received a MIMO telecommunication system can be represented as a point of a lattice corrupted by noise and that, accordingly, a sphere decoder can be used at the receiver side for obtaining a ML estimation of the transmitted symbol vector. More precisely, the sphere decoding method has been proposed for both an uncoded MIMO system, i.e. a system in which the substreams of symbols associated with the different transmit antennas are coded independently and for a MIMO system using so-called algebraic space-time codes. An example of such codes can be found in the PhD. thesis of O. Damen entitled "Joint coding/decoding in a multiple access system—Application to mobile communications" ENST, Paris.

Let us consider a MIMO telecommunication system as represented in FIG. 1 and let us denote $x(p)=(x_1(p), x_2(p), \ldots, x_M(p))$ and $y(p)=(y_1(p), y_2(p), \ldots, y_N(p))$ respectively the vector of symbols transmitted by the antennas and the vector of signals received by the antennas at a given time p. We suppose first that the MIMO system the substreams of symbols have been independently coded. We may write:

$$y_n(p) = \sum_{m=1}^{M} h_{mn}(p) x_m(p) + \eta_n(p) \qquad (1)$$

where $h_{mn}(p)$ is the fading coefficient for the propagation path between transmit antenna m and receive antenna n at time p and $\eta_n(p)$ is the noise sample affecting the received signal $y_n(p)$. In general, the transmission is based on frames of length L and the coefficients are supposed constant over a transmission frame but may vary from frame to frame, e.g. the M×N transmission channels from the M transmit antennas to the N receive antennas are supposed to be quasi-static Rayleigh channels. The fading coefficients are supposed to be known at the receiver, for example thanks to an estimation of pilot symbols transmitted by the different transmit antennas. The noise samples are supposed to be samples of independent complex Gaussian variables with zero mean (AWGN noise) and variance $\sigma^2$.

It should be noted that the transmitted symbols does not necessarily belong to the same modulation constellation.

The expression (1) can be rewritten by adopting a matrix formulation and omitting the time index p:

$$y = xH + \eta \qquad (2)$$

where H is a M×N matrix defined by $H=(h_{mn})$, $m=1, \ldots, M$; $n=1, \ldots, N$.

The complex components of the vectors x, y and η in equation (2) can respectively be expressed as $x_m = x_m^R + j x_m^I$, $y_m = y_m^R + j y_m^I$, $\eta_m = \eta_m^R + j \eta_m^I$. Similarly the complex coefficients $h_{mn}$ of the matrix H can be expressed as $$h_{mn} = h_{mn}^R + j h_{mn}^I$$

where $$h_{mn}^R \text{ and } h_{mn}^I$$

are real.

Denoting $x'=(x_1^R, x_1^I, \ldots, x_M^R, x_M^I)$, $y'=(y_1^R, y_1^I, \ldots, y_N^R, y_N^I)$, $\eta'=(\eta_1^R, \eta_1^I, \ldots, \eta_N^R, \eta_N^I)$ and $H' = \begin{bmatrix} h_{11}^R & h_{11}^I & \cdots & h_{1N}^R & h_{1N}^I \\ -h_{11}^I & h_{11}^R & \cdots & -h_{1N}^I & h_{1N}^R \\ \vdots & \vdots & & \vdots & \vdots \\ h_{M1}^R & h_{M1}^I & \cdots & h_{MN}^R & R_{MN}^I \\ -h_{M1}^I & h_{M1}^R & \cdots & -R_{MN}^I & R_{MN}^R \end{bmatrix}$, we can rewrite the expression (2) as:

$$y' = x'H' + \eta' \quad (3)$$

where y' and η' are 1×2N real vectors, x' is a 1×2M real vector and H' is a 2M×2N real matrix. Without loss of generality, it will be supposed in the sequel that the real and imaginary components $x_m^R$ and $x_m^I$ of each transmitted symbol $x_m$ are PAM modulated, i.e.:

$$x_m^R \in \{-M_{2m-1}+1, -M_{2m-1}+3, \ldots, M_{2m-1}-3, M_{2m-1}-1\} \text{ and} \quad (4)$$

$$x_m^I \in \{-M_{2m}+1, -M_{2m}+3, \ldots, M_{2m}-3, M_{2m}-1\} \quad (5)$$

where $M_{2m-1}$ and $M_{2m}$ are the modulation orders for $x_m^R$ and $x_m^I$ respectively. For example if $x_m$ is a 16-QAM modulated symbol $M_{2m-1}=M_{2m}=4$.

The following results can be extended to the case where the transmitted symbols are PSK modulated, as shown in the article of Hochwald et al. entitled "Achieving near-capacity on a multiple antenna channel" available on the website mars.bell-labs.com.

If the following affine transformation is effected:

$$\tilde{x}_m^R = \frac{1}{2}(x_m^R + M_{2m-1} - 1) \text{ and } \tilde{x}_m^I = \frac{1}{2}(x_m^I + M_{2m} - 1)$$

or again vectorially:

$$\tilde{x} = \frac{1}{2}(x' + \mu) \quad (6)$$

where $\tilde{x}=(\tilde{x}_1^R, \tilde{x}_1^I, \ldots, \tilde{x}_M^R, \tilde{x}_M^I)$ and $\mu=(M_1-1, M_2-1, \ldots, M_{2M}-1)$. The components of $\tilde{x}$ are elements of Z and consequently $\tilde{x}$ is a vector of $Z^{2M}$.

In general terms, there exists an affine transform transforming the components $x_m^R$ and $x_m^I$ into elements of Z and the vector $\tilde{x}$ can consequently be represented as a vector of $Z^{2M}$.

In a similar manner, the corresponding transform is effected on y' as defined in (3), that is to say:

$$\tilde{y} = \frac{1}{2}(y' + \mu H') \quad (7)$$

The vector $\tilde{y}$ in equation (7) can therefore be expressed as:

$$\tilde{y} = \tilde{x}H' + \eta'/2 \quad (8)$$

We suppose that M≦N (i.e. the number of receive antennas is larger than the number of transmit antennas) and rank(H')=2M, which is the case in practice if the fading coefficients are decorrelated. The following results can however be extended to the case where M>N as shown in the article of O. Damen et al. entitled "A generalized sphere decoder for asymmetrical space-time communication architecture" published in Elec. Letters, vol. 36, pp. 166-168, January 2000. Indeed, in such instance, an exhaustive search can be effected for M−N symbols among the M transmitted symbols, the remaining N symbols being searched by the sphere decoding method as described further below.

The vector $\tilde{y}$ can be regarded as a point of a lattice Λ of dimension 2M in $R^{2N}$ and of generator matrix H', corrupted by a noise η'/2. Indeed, a lattice Λ of dimension κ in a vectorial space of dimension K is defined by any set of vectors v of $R^K$ satisfying:

$$v = b_1 v_1 + b_2 v_2 + \ldots + b_\kappa v_\kappa \quad (9)$$

where $\{v_1, v_2, \ldots, v_\kappa\}$ are linearly independent vectors of $R^K$ and $b=(b_1, \ldots, b_\kappa) \in Z^\kappa$.

The vectors $v_1, v_2, \ldots, v_\kappa$ form the rows of the so-called generator matrix G of the lattice., and are therefore called the generating vectors of said the lattice. It is therefore possible to write:

$$v = bG \quad (10)$$

Such a lattice has been represented in FIG. 2A in the simple case κ=2. In general, the dimension of the lattice Λ generated by G=H' is κ=2M in a space of dimension K=2N.

The set of transmitted symbols can be represented by an alphabet of finite size $\Pi \subset Z^{2M}$ hereinafter referred to as a product constellation. This product constellation is determined by the modulation constellations used for modulating the M symbol substreams and the cardinal of the alphabet Π is equal to the product of the cardinals of the different modulation alphabets. The product constellation Π corresponds to a subset of the lattice Λ.

An exhaustive maximum likelihood decoding would require a search for the closest neighbour throughout the product constellation Π, i.e. would require to search for z∈Π so that the distance $\|z-\tilde{y}\|$ is minimum (in the representation of FIG. 2A).

The sphere decoding method calculates the distances to the points which are situated within an area of the lattice situated around the received point, preferably inside a sphere S of given radius $\sqrt{C}$ centered on the received point as depicted in FIG. 2A. Only the points in the lattice situated at a quadratic distance less than C from the received point are therefore considered for the minimization of the metric.

In practice, the decoder effects the following minimization:

$$\min_{z \in \Lambda} \|z - \tilde{y}\| = \min_{w \in \tilde{y} - \Lambda} \|w\| \quad (11)$$

To do this, the smallest vector w in the translated set $\tilde{y}-\Lambda$ is sought. If we denote $\rho = \tilde{y}H'^+$ and $\xi = wH'^+$ where $H'^+$ is the pseudo-inverse (also called the Moore-Penrose inverse) of the matrix H', the vectors $\tilde{y}$ and w can be expressed as:

$$\tilde{y} = \rho H' \text{ with } \rho = (\rho_1, \ldots, \rho_{2M}) \ w = \xi H' \text{ with } \xi = (\xi_1, \ldots, \xi_{2M}) \quad (12)$$

It is important to note that ρ and ξ are both real vectors. According to expression (8) the vector ρ can be regarded as the ZF estimation of the vector $\tilde{x}$. As w=$\tilde{y}$−z, where z=bH', belongs to the lattice Λ, we have $\xi_i = \rho_i - b_i$ for i=1, ..., 2M with $$w = \sum_{i=1}^{2M} \xi_i v_i.$$

The vector w is a point in the lattice whose coordinates $\xi_i$ are expressed in the translated reference frame centered on the received point $\tilde{y}$. The vector w belongs to a sphere of quadratic radius C centered at 0 if and only if:

$$\|w\|^2 = Q(\xi) = \xi H'H'^T \xi^T \leq C \qquad (13)$$

In the new system of coordinates defined by $\rho$, b and $\xi$ the sphere of quadratic radius C centered at $\tilde{y}$ is therefore transformed into an ellipsoid E and the lattice $\Lambda$ is represented as elements of $Z^{2M}$. This representation is illustrated in FIG. 2B. It should be understood that it is equivalent to the one illustrated in FIG. 2A.

The Cholesky factorization of the Gram matrix $\Gamma = H'H'^T$ gives $\Gamma = \Delta\Delta^T$, where $\Delta$ is an inferior triangular matrix of elements $\delta_{ij}$. The expression (13) can be rewritten:

$$Q(\xi) = \xi \Delta \Delta^T \xi^T = \|\Delta^T \xi^T\|^2 = \sum_{i=1}^{2M} \left( \delta_{ii} \xi_i + \sum_{j=i+1}^{2M} \delta_{ji} \xi_j \right)^2 \leq C \qquad (14)$$

By putting:

$$q_{ii} = \delta_{ii}^2 \text{ for } i = 1, \ldots, 2M \qquad (15)$$

$$q_{ij} = \frac{\delta_{ij}}{\delta_{jj}} \text{ for } j = 1, \ldots, 2M; \quad i = j+1, \ldots, 2M$$

there is obtained:

$$Q(\xi) = \sum_{i=1}^{2M} q_{ii} \left( \xi_i + \sum_{j=i+1}^{2M} q_{ji} \xi_j \right)^2 \qquad (16)$$

Being concerned first of all with the range of possible variations of $\xi_{2M}$, and then adding the components one by one by decreasing index order, the following 2M inequalities are obtained, which define all the points within the ellipsoid:

$$q_{2M,2M} \xi_{2M}^2 \leq C \qquad (17)$$

$$q_{2M-1,2M-1}(\xi_{2M-1} + q_{2M,2M-1}\xi_{2M})^2 + q_{2M,2M}\xi_{2M}^2 \leq C$$

$$\forall l \in \{1, \ldots, 2M\}, \sum_{i=l}^{2M} q_{ii}\left(\xi_i + \sum_{j=i+1}^{2M} q_{ji}\xi_j\right)^2 \leq C$$

It can be shown that the inequalities (17) make it necessary and sufficient for the integer components of b to satisfy:

$$\left\lceil -\sqrt{\frac{C}{q_{2M,2M}}} + \rho_{2M} \right\rceil \leq b_{2M} \leq \left\lfloor \sqrt{\frac{C}{q_{2M,2M}}} + \rho_{2M} \right\rfloor \qquad (18)$$

-continued $$\left\lceil -\sqrt{\frac{C - q_{2M,2M}\xi_{2M}^2}{q_{2M-1,2M-1}}} + \rho_{2M-1} + q_{2M,2M-1}\xi_{2M} \right\rceil \leq$$

$$b_{2M-1} \leq \left\lfloor -\sqrt{\frac{C - q_{2M,2M}\xi_{2M}^2}{q_{2M-1,2M-1}}} + \rho_{2M-1} + q_{2M,2M-1}\xi_{2M} \right\rfloor$$

$$\left\lceil -\sqrt{\frac{1}{q_{ii}}\left(C - \sum_{l=i+1}^{2M} q_{ll}\left(\xi_l + \sum_{j=l+1}^{2M} q_{jl}\xi_j\right)^2\right)} + \rho_i + \sum_{j=i+1}^{2M} q_{ji}\xi_j \right\rceil \leq b_i$$

$$b_i \leq \left\lfloor \sqrt{\frac{1}{q_{ii}}\left(C - \sum_{l=i+1}^{2M} q_{ll}\left(\xi_l + \sum_{j=l+1}^{2M} q_{jl}\xi_j\right)^2\right)} + \rho_i + \sum_{j=i+1}^{2M} q_{ji}\xi_j \right\rfloor$$

where $\lceil x \rceil$ is the smallest integer greater than the real number x and $\lfloor x \rfloor$ is the largest integer smaller than the real number x.

In practice 2M internal counters are used, namely one counter per dimension, each counter counting between a lower and an upper bound as indicated in (18), given that each counter is associated with a particular pair of bounds. In practice these bounds can be updated recursively. We put:

$$S_i = S_i(\xi_{i+1}, \ldots, \xi_{2M}) = \rho_i + \sum_{j=i+1}^{2M} q_{ji}\xi_j \qquad (19)$$

$$T_{i-1} = T_{i-1}(\xi_i, \ldots, \xi_{2M}) = \qquad (20)$$

$$C - \sum_{l=i}^{2M} q_{ll}\left(\xi_l + \sum_{j=l+1}^{2M} q_{jl}\xi_j\right)^2 = T_i - q_{ii}(\xi_i + S_i - \rho_i)^2$$

$$T_{i-1} = T_i - q_{ii}(S_i - b_i)^2 \qquad (21)$$

with $T_{2M} = C$.

Using equations (19) to (21), the range of variation of each component $b_i$ is determined recursively, commencing with the component $b_{2M}$:

$$L_i^- \leq b_i < L_i^+ \qquad (22)$$

with $$L_i^- = \left\lceil -\sqrt{\frac{T_i}{q_{ii}}} + S_i \right\rceil \text{ and } L_i^+ = \left\lfloor \sqrt{\frac{T_i}{q_{ii}}} + S_i \right\rfloor \qquad (23)$$

For each candidate vector b (in the representation of FIG. 2B), it is checked whether $b \in \Pi$. Once the closest vector b is found, the estimates of the real and imaginary parts the transmitted symbols are simply obtained from (6):

$$\hat{x}' = 2b - \mu \qquad (24)$$

As described above, in relation with expressions (18) to (23), the sphere decoding process necessitates to go through every lattice point included in the ellipsoid defined by (17) and to compute for each of them the norm $\|w\|$. This scanning algorithm is very time consuming, in particular for a large number of transmit antennas M.

In order to speed up the sphere decoding process it has already been proposed to update the radius $\sqrt{C}$ with the lowest computed norm ‖w‖, thereby scaling down the ellipsoid each time a lower norm is found. Each resealing implies however the computation of new bounds $L_i^-$ and $L_i^+$ and is followed by a new search between the updated bounds. It is therefore desirable to reduce the complexity of a sphere decoding method in a receiver of a MIMO telecommunication system for obtaining an estimation of the transmitted symbols.

FIG. 3A illustrates schematically an example of a space-time encoder 110, as disclosed in the article of B. Hassibi et al. in the article entitled "High-rate codes that are linear in space and time" available on the website mars.bell-labs.com.

The input data stream $D_{in}$ input to the space-time encoder is multiplexed by a multiplexer 111 in a plurality Q of bit substreams which are respectively mapped by the symbol mappers $112_1, \ldots, 112_Q$ into Q symbol substreams. A space-time dispersion symbol encoder 113, the function of which is hereinafter described, transforms a block of Q uncoded symbols, denoted $x_1^u, \ldots, x_Q^u$ into a frame of L consecutive vectors $(x_1(1), \ldots, x_M(1)), (x_1(2), \ldots, x_M(2)), \ldots, (x_1(L), \ldots, x_M(L))$, each vector being transmitted by the M transmit antennas $130_1, 130_2, \ldots, 130_M$. In general, the symbols $x_1(p), \ldots, x_M(p)$ transmitted at a given time $p=1, \ldots, L$ are not independent. More precisely, each uncoded symbol $x_q^u$ is coded in 113 by two L×M spatio-temporal dispersion matrices $A_q$ and $B_q$ as a combination $x_q^u.A_q + x_q^{u*}B_q$ (where .* denotes the conjugate) and the block of symbols $x_1^u, \ldots, x_Q^u$ is coded as the sum:

$$X = \sum_{q=1}^{Q} (x_q^u . A_q + x_q^{u*} B_q) \quad (25)$$

where the rows of the matrix X are the vectors of the transmitted symbols at the different times $p=1, \ldots, L$.

FIG. 3B illustrates schematically the structure of the detector 160 when the space-time encoder of FIG. 3A is used. A symbol decoder 161 inputs the L consecutive vectors $(y_1(1), \ldots, y_N(1)), (y_1(2), \ldots, y_N(2)), \ldots, (y_1(L), \ldots, y_N(L))$ each vector being relative to a reception time $p=1, \ldots, L$ and constituted of the signals received by the N receive antennas $140_1, 140_2, \ldots, 140_N$ at that time.

The L consecutive vectors can be represented as rows of a L×N matrix Y. We have:

$$Y = XH + \Xi \quad (26)$$

where $\Xi$ is a L×N matrix the rows of which represent the complex noise samples affecting the received symbols for the L consecutive timeslots.

In practice, for a given number N of transmit antennas, the block size Q and the frame length L are chosen such that $Q \leq L.N$ in order to avoid that the linear system (26) be undetermined in $x_1^u, \ldots, x_Q^u$. It should also be noted that if Q<L.M, some redundancy is introduced at the symbol coding level by the symbol encoder 113.

It can be shown that the expression (26) can equivalently be reformulated as follows:

$$y'_L x^{u}H'_L + \eta'_L \quad (27)$$

where $y'_L$ is the 1×2LN vector obtained by concatenating the L consecutive vectors $y'(p) = (y_1^R(p), y_1^I(p), \ldots, y_N^R(p), y_N^I(p))$, $p=1, \ldots, L$; $\eta'_L$ is the 1×2LN vector obtained by concatenating the L consecutive vectors $\eta'(p) = (\eta_1^R(p), \eta_1^I(p), \ldots, \eta_N^R(p), \eta_N^I(p))$ $p=1, \ldots, L$; $x^{u}$ is the 1×2Q vector $$(x_1^{uR}, x_1^{uI} \ldots, x_Q^{uR}, x_Q^{uI},)$$

where $$x_q^u = x_q^{uR} + j x_q^{uI}$$

and $H'_L$ is a 2Q×2LN matrix of real coefficients obtained from the (real and imaginary parts of the) matrix H of the fading coefficients and the (real and imaginary parts of the) dispersion matrices $A_q$ and $B_q$, $q=1, \ldots, Q$. If $Q \leq L.N$ and the dispersion matrices are properly chosen, the matrix is not degenerate.

The expression (27) is similar to (3), though it involves higher vector and matrix dimensions: the number (N) of receive antennas is multiplied by the number (L) of timeslots and the number (M) of transmit antennas is replaced by the block size (Q) of the uncoded symbols. The product constellation Π is generated by the constellation modulations used for mapping the different symbols of the block.

The symbol decoder 161 may therefore carry out a sphere decoding method as set out above, the lattice being here generated by the generator matrix $H'_L$ instead of the matrix H', and therefore has a dimension κ=2Q in a space of dimension K=2LN. The sphere decoding algorithm provides a vector $\hat{x}^u$ (from an expression similar to (24)) which gives the estimates $$\hat{x}_1^{uR}, \hat{x}_1^{uI} \ldots, \hat{x}_Q^{uR}, \hat{x}_Q^{uI},$$

i.e. the complex estimates $\hat{x}_q^u$ of the uncoded symbols $x_q^u$. The Q estimates are demapped by the demappers $162_1, \ldots, 162_Q$ and the binary substreams thus generated are demultiplexed by a demultiplexer 163 to produce a stream of received data $D_{out}$.

It should be noted that when a space-time dispersion symbol encoder is used, the sphere decoding method enables the detection of the symbols $x_q^u$ input to the encoder and not of the symbols $x_m$ as transmitted.

If the block size Q is large, scanning the candidate lattice points within the ellipsoid, along each of the 2Q dimensions of the lattice (M is to be replaced by Q in the expressions (18)) may be very time consuming.

SUMMARY OF THE INVENTION

It is therefore an aim of the present invention to propose a measure to significantly reduce the complexity of a sphere decoding method in the receiver of a MIMO telecommunication system, in particular if a space-time dispersion symbol coder is used at the transmitter.

To this end, the invention is defined by the estimating method claimed in the independent claims. Advantageous variants of the invention are defined in the dependent claims.

BRIEF DESCRIPTION OF THE DRAWINGS

The characteristics of the invention mentioned above, as well as others, will emerge more clearly from a reading of the following description given in relation to the accompanying figures, amongst which.

DESCRPTION OF THE PREFERRED EMBODIMENTS

We consider again a MIMO telecommunication system using a sphere decoding method at the receiver side. The invention concerns a measure for accelerating the sphere decoding method which can be applied either for estimating the symbols $(x_1, \ldots, x_M)$ transmitted by the transmit antennas, if these symbols are independently coded (first embodiment), or for estimating the symbols $(x_1^u, \ldots, x_Q^u)$ at the input of a space-time dispersion symbol encoder (second embodiment).

Figure 1:
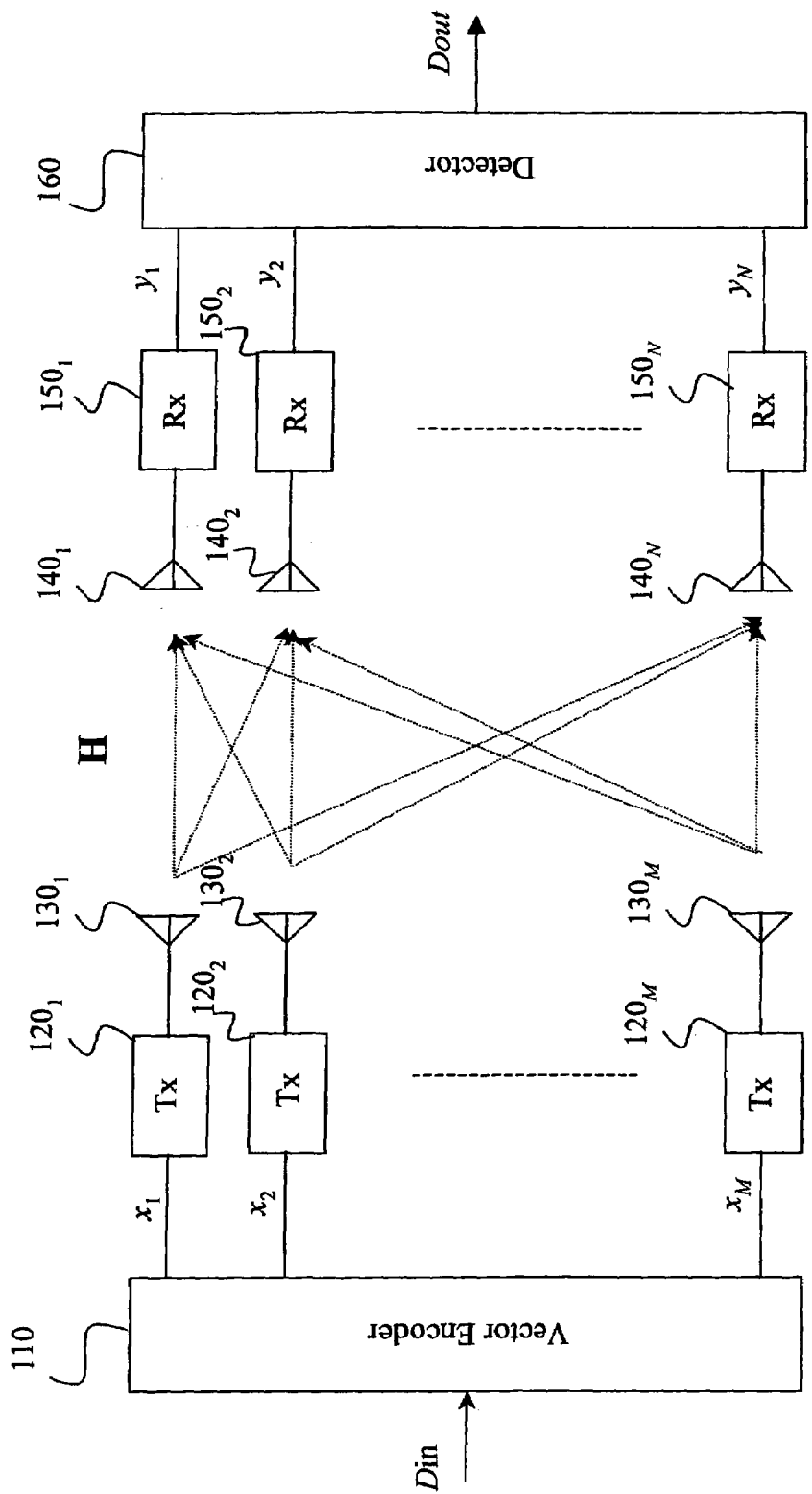
FIG. 1 represents schematically the structure of a transmitter and a receiver in a MIMO telecommunication system.
Figure 2A:
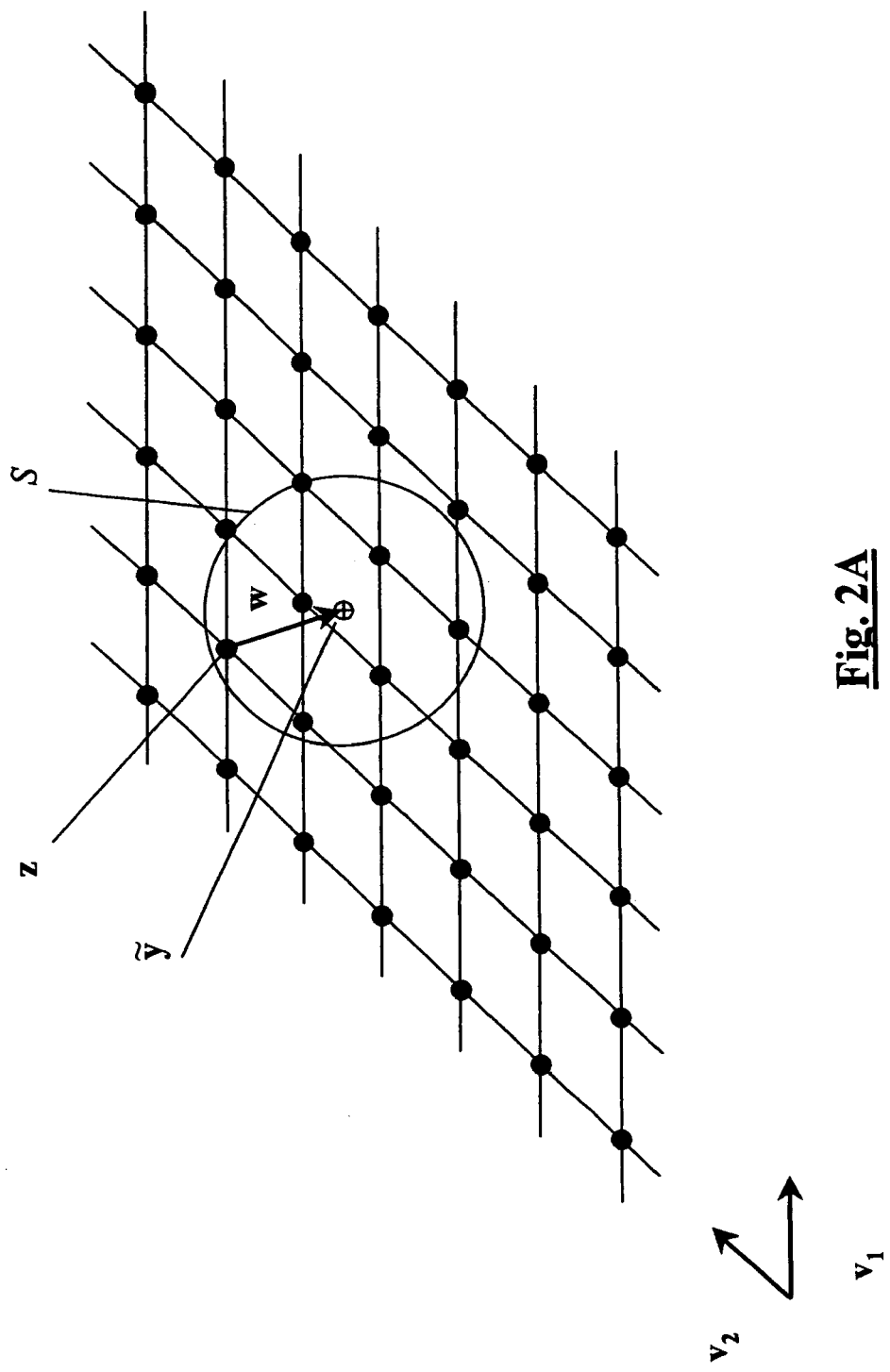
FIG. 2A is a first representation of a bidimensional lattice of points as used in a sphere decoding method.
Figure 2B:
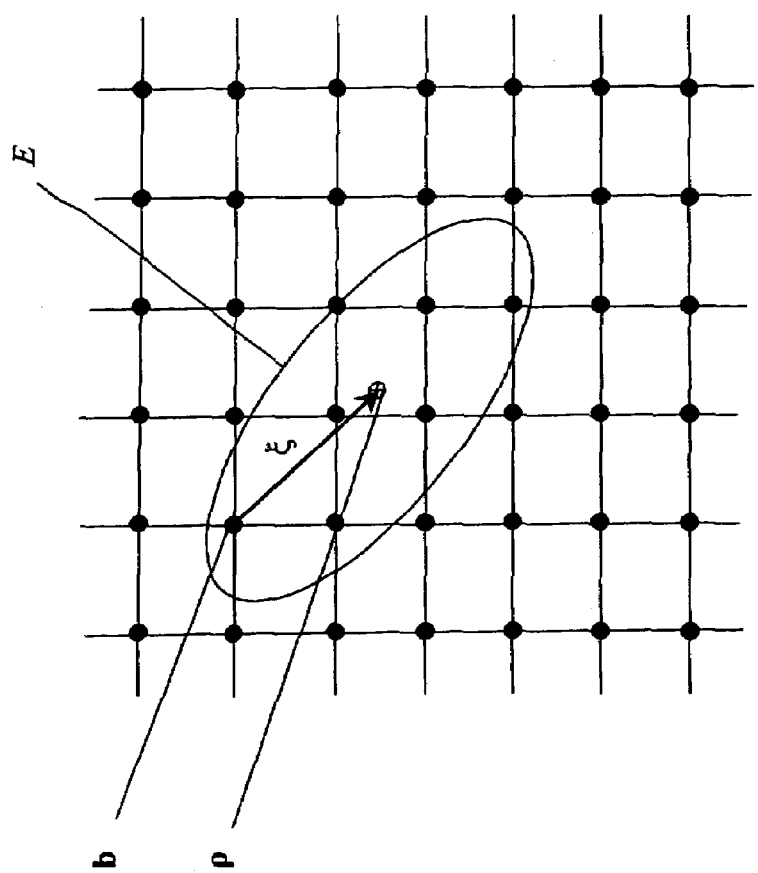
FIG. 2B is a second representation of a bidimensional lattice of points as used in a sphere decoding method.

Considering the first embodiment and the lattice $\Lambda$ generated by the matrix $H'$, the dimensions $2m-1$ and $2m$ of the lattice bear respectively the real part and the imaginary part of the complex symbol transmitted by the antenna m. The dimensions $2m-1$ and $2m$ of the lattice $\Lambda$ have been represented in FIG. 4 (according to the type of representation of FIG. 2B).

The product constellation $\Pi$, or equivalently the modulation constellation associated with the symbols transmitted by the antenna m, is projected onto the dimension $2m$ of the lattice. This projection defines an interval $$[M_{2m}^-, M_{2m}^+].$$

The bounds $$L_{2m}^- \text{ and } L_{2m}^+$$

having been determined in accordance with expressions (19) to (23), a search interval $$[B_{2m}^-, B_{2m}^+]$$

along the $m^{th}$ dimension is defined by:

$$B_{2m}^- = \max(L_{2m}^-, M_{2m}^-) \text{ and } B_{2m}^+ = \min(L_{2m}^+, M_{2m}^+) \quad (28)$$

Once a value $b_{2m}$ has been chosen in the search interval $$[B_{2m}^-, B_{2m}^+],$$

the bounds $$L_{2m-1}^- \text{ and } L_{2m-1}^+$$

are determined and a new search interval $$[B_{2k-1}^-, B_{2k-1}^+]$$

along the dimension $2m-1$ is defined by:

$$B_{2m-1}^- = \max(L_{2m-1}^-, M_{2m-1}^-) \text{ and } B_{2m-1}^+ = \min(L_{2m-1}^+, M_{2m-1}^+) \quad (29)$$

where $$[M_{2m-1}^-, M_{2m-1}^+]$$

is the projection of the product constellation (or equivalently of modulation constellation associated with the symbols transmitted by the antenna m) onto the dimension $2m-1$.

Figure 4:
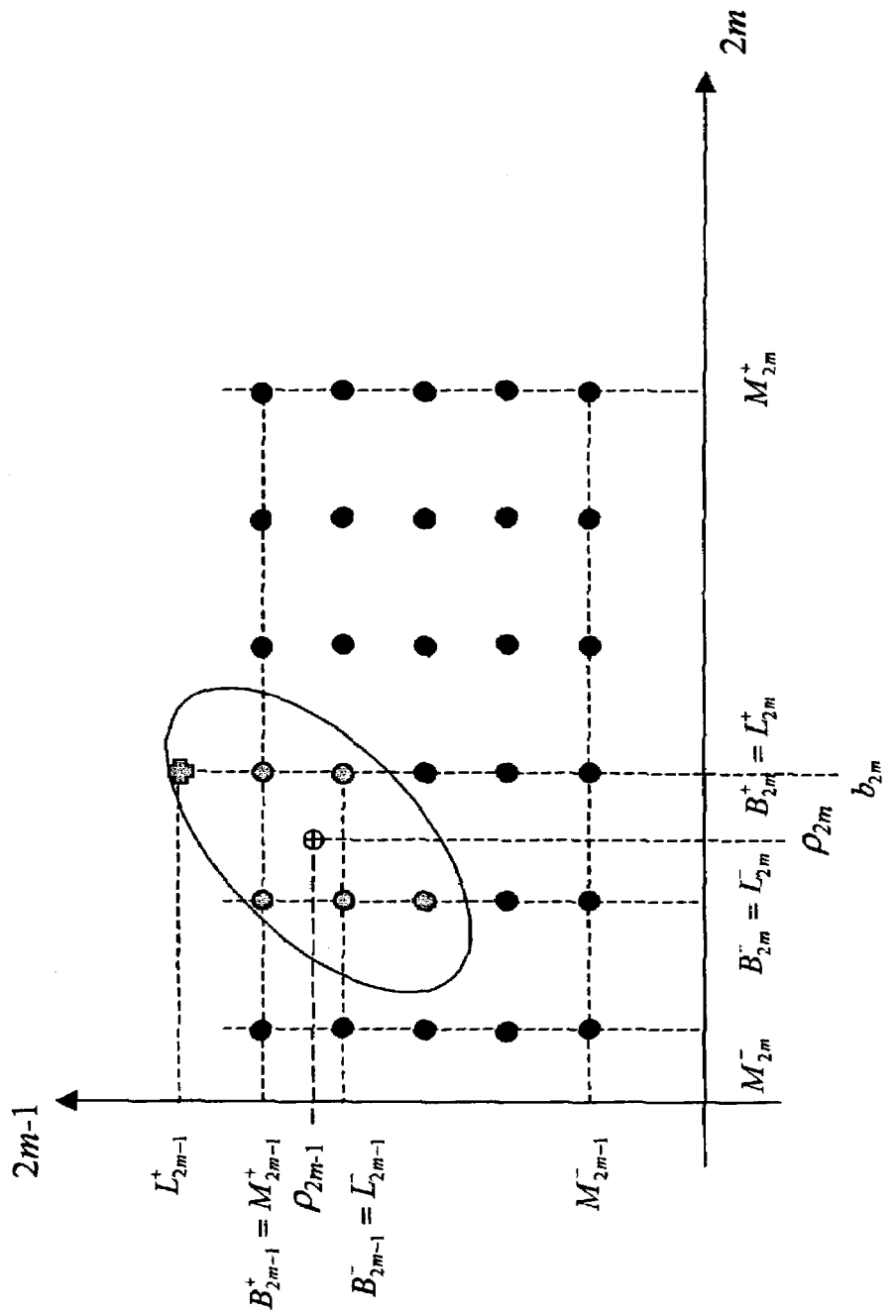
FIG. 4 depicts schematically an example of sphere decoding method taking into account the product constellation.

The points of the lattice located within the ellipsoid are represented in FIG. 4 by grey circles if they belong to the product constellation $\Pi$ whereas they are represented by grey crosses if they are located outside the product constellation.

The sphere decoding method proceeds sequentially from a dimension to the preceding one. By varying for a given dimension each component $b_i$ where $i \in \{1, \ldots, 2M\}$ inside an interval $[B_i^-, B_i^+]$ instead of $[L_i^-, L_i^+]$, it is ensured that the closest neighbour is sought only amongst candidates which are both located within the ellipsoid and belonging to the product constellation.

The idea underlying the invention in that the order according to which the dimensions of the lattice are treated strongly influence the complexity of the search. As it appears from (18), the search starts with the dimension of highest order (2M in the present embodiment) corresponding to the last row of the generator matrix $H'$ and proceeds sequentially with dimensions of lower order.

Figure 5:
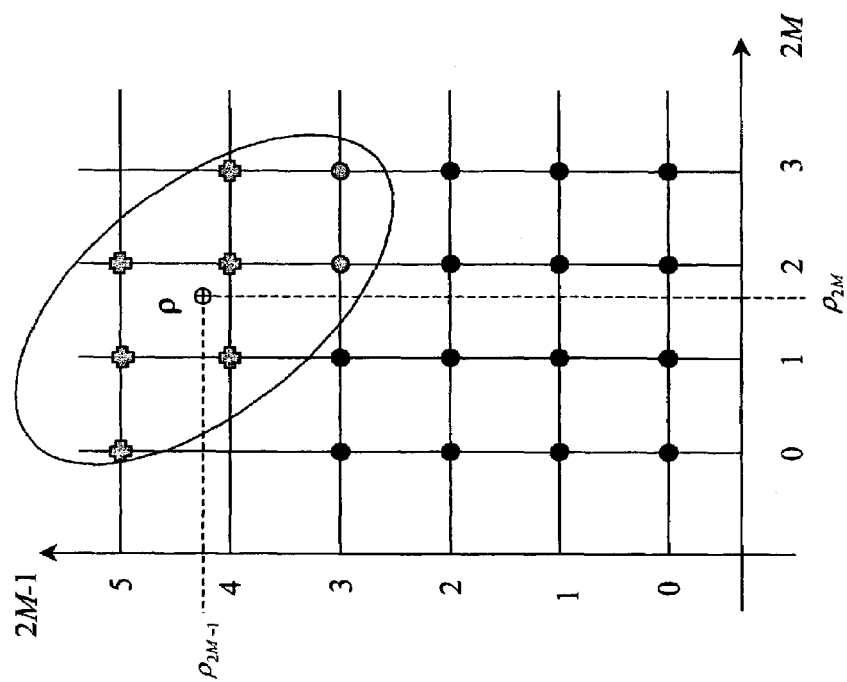
FIG. 5 illustrates the projection of the product constellation and the received point onto the hyperplane defined by the first two dimensions used in sphere decoding.

Let us consider the first two dimensions searched, 2M and 2M-1, for a given product constellation, as illustrated in FIG. 5.

The points belonging to the product constellation are represented by circles, coloured in grey if they are located in the ellipsoid and coloured in black otherwise. Grey crosses indicate the lattice points located in the ellipsoid but not belonging to the constellation. The projection of ρ representing the received signal ($\rho=\hat{y}H'^t$) onto the hyperplane defined by the dimensions 2M and 2M−1 is characterised by its real coordinates $\rho_{2M}$ and $\rho_{2M-1}$.

The symbols transmitted by the transmit antenna m are supposed 16-QAM. The projection of the product constellation (or the associated modulation constellation) onto the dimension 2M or 2M−1 corresponds therefore to the interval [0,3].

Figures 6A, 6B:
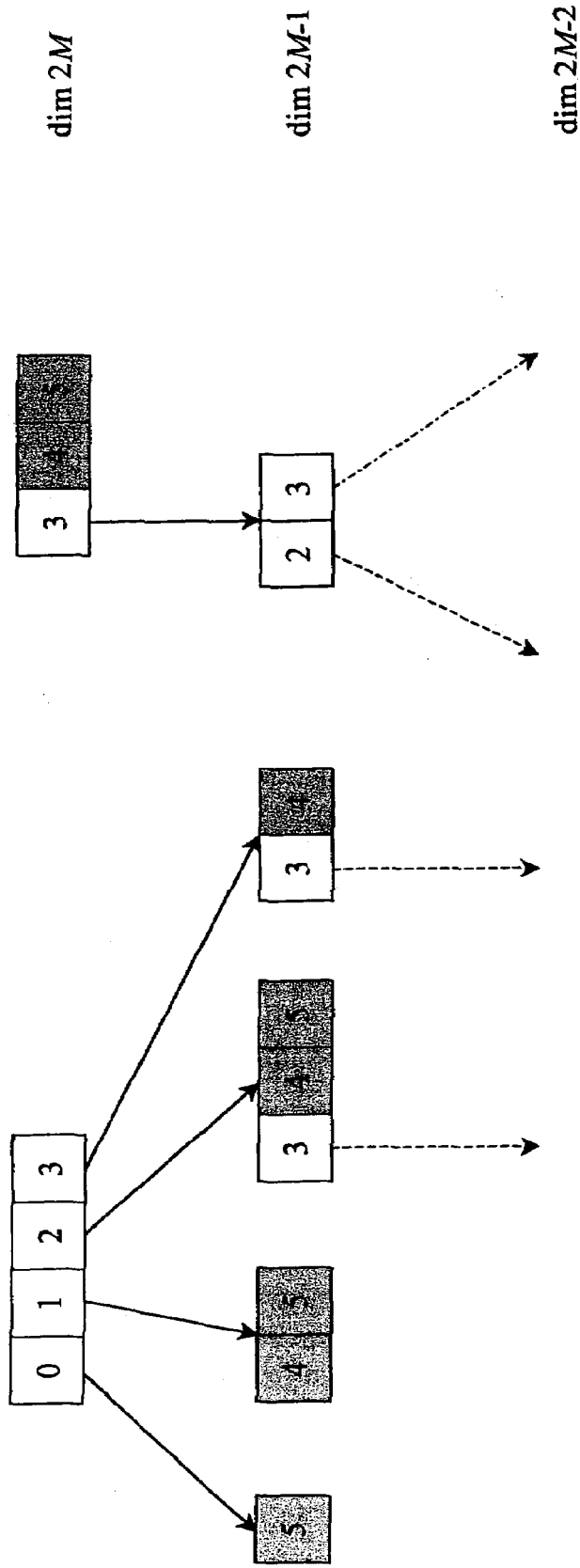
FIG. 6A gives the search tree of a sphere decoding method according to the prior art.
FIG. 6B gives the search tree of a sphere decoding method according to the invention.

A search tree using conventional sphere decoding has been represented in FIG. 6A where each level of the tree corresponds to a dimension of the lattice, the lowest level being associated with the dimension of highest order (2M). Although the first two levels (corresponding to the dimensions 2M and 2M−1 of FIG. 5) are represented, it should be understood that the search tree comprises 2M levels. The horizontal extension of each node of the tree indicates the interval $[L_i^-, L_i^+]$, the sub-interval $[B_i^-, B_i^+]$ of which is represented by white boxes while the rest is represented by grey boxes.

The search starts with the determination of $$[B_{2m}^-, B_{2m}^+].$$

From FIG. 5, it appears that $$[L_{2M}^-, L_{2M}^+] = [0,3] \text{ and } [M_{2M}^-, M_{2M}^+] = [0,3],$$

hence $$[B_{2M}^-, B_{2M}^+] = [0,3]$$

which means that $b_{2M}$ can take four possible values:

If $b_{2M}=0$, $$[B_{2M-1}^-, B_{2M-1}^+] = [L_{2M-1}^-, L_{2M-1}^+] \cap [M_{2M-1}^-, M_{2M-1}^+] = \{5\} \cap [0,3] = \emptyset,$$

hence no candidate value of $b_{2M-1}$ is to be considered and the node is therefore a dead leaf.

If $b_{2M}=1$, $$[B_{2M-1}^-, B_{2M-1}^+] = [L_{2M-1}^-, L_{2M-1}^+] \cap [M_{2M-1}^-, M_{2M-1}^+] = \{4,5\} \cap [0,3] = \emptyset,$$

hence this node is also a dead leaf.

If $b_{2M}=2$, $$[B_{2M-1}^-, B_{2M-1}^+] = [L_{2M-1}^-, L_{2M-1}^+] \cap [M_{2M-1}^-, M_{2M-1}^+] =$$

$$\{3,5\} \cap [0,3] = \{3\},$$

hence $b_{2M-1}=3$ is the single candidate value to be considered. Only one branch starts from this node to the subsequent level 2M−2.

If $b_{2M}=3$, $$[B_{2M-1}^-, B_{2M-1}^+] = [L_{2M-1}^-, L_{2M-1}^+] \cap [M_{2M-1}^-, M_{2M-1}^+] =$$

$$\{3,4\} \cap [0,3] = \{3\},$$

hence $b_{2M-1}=3$ is again the single candidate value to be considered. Only one branch starts from this node to the level 2M−2.

We define the passing rate $\sigma_i$ of a node of the search tree by the ratio:

$$\sigma_i = \frac{|B_i^+ - B_i^-|}{|L_i^+ - L_i^-|} \quad (28)$$

The passing rate of a node is a measure of the filtering effect induced by the restriction of the search to the interval $[B_i^-, B_i^+]$. If the passing rate is low, the filtering effect is high and, conversely, if the passing rate is high, the filtering effect is low.

The passing rate of a given dimension or, equivalently of a level of the tree, is defined as the average passing rate of the nodes belonging to that level.

As it can be seen from FIG. 6A, the search tree is poorly selective at its root (4 candidates retained for $b_{2M}$ out of four) while the nodes at a higher level are significantly more selective (at most 1 candidate retained out of three for $b_{2M-1}$). It should be noted that the passing rate of a node can be obtained as the ratio of white boxes to the total number of boxes of said node.

Such a tree is ill-conditioned for the search because a lot of branches finally ending to dead leaves (i.e. associated with a void interval $[B_i^-, B_i^+]$) are explored in vain, the calculation of the bounds made at the intermediate nodes along the branch proving useless in the end.

According to the invention, it is proposed to reorder the vectors of the lattice, i.e. the rows of the generator matrix H', so that the root and low level nodes of the search tree correspond to low passing rates (i.e. high selectivity). This enables to discard at an early stage large parts of the ellipsoid which do not intersect the constellation. The reordering of the vectors of the lattice implies the same reordering of the components of the vectors ρ and b.

According to a first variant, the rows of the generator matrix or the dimensions are ordered according to values representing the distance of the projected centre of the ellipsoid, normalized to the size of the projected constellation. More specifically for each row or dimension i, it is calculated:

$$\varepsilon_i = \frac{2 \cdot \delta_i}{|M_i^+ - M_i^-|} \quad (29)$$

where $$\delta_i = \left| \rho_i - \frac{1}{2}(M_i^- + M_i^+) \right|$$

denotes the distance of the centre of the ellipsoid, projected onto dimension i, to the middle of the projected constellation.

In practice, the man skilled in the art will understand that any expression reflecting the said normalized distance could be used instead of expression (29).

The value $\epsilon_i$ represents the eccentricity of the projection of the constellation centre relatively to the projected constellation. The higher the eccentricity, the more likely the interval $[L_i^-, L_i^+]$ and $[M_i^-, M_i^+]$ will little overlap and the interval $[B_i^-, B_i^+]$ will be smaller than $[L_i^-, L_i^+]$.

The first variant makes use of a first ordering rule. According to this rule, the rows are ordered by increasing values of $\epsilon_i$, namely the larger the normalized distance (or, equivalently the higher the eccentricity), the higher the order of the row. By so doing, the low levels in the search tree correspond to dimensions for which the projection of the ellipsoid centre lies far outside the projection of the constellation. The dimensions exhibiting low passing rates are therefore concentrated at the low levels of the tree, thus enabling to early discard lattice points. By applying the first reordering rule, the search of the candidate points belonging to the intersection of the ellipsoid with the constellation is significantly accelerated.

According to a second variant, directed to the case where the constellation has the same size along each and every dimension (for example if all the transmitted symbols belong to the same modulation constellation) the following ordering rules are used:

The second variant may use a second ordering rule. According to this rule the last rows of the generator matrix H' are chosen so that they correspond to the dimensions i where $\rho_i < M_i^-$ or $\rho_i > M_i^+$. Denoting $\delta'_i$ the distance between $\rho_i$ and $M_i^-$ (if $\rho_i < M_i^-$) or between $\rho_i$ and $M_i^+$ (if $\rho_i > M_i^+$), these rows are ordered by increasing values of $\delta'_i$, namely the higher the distance, the higher the order of the row. The search begins with dimensions exhibiting comparatively high distance values. The low levels of the search tree correspond therefore to dimensions for which the projection of the ellipsoid centre lies far outside the projection of the constellation. Consequently, the dimensions exhibiting low passing rates are concentrated at the low levels of the tree.

The second variant may use a third ordering rule. According to this rule, the first rows of the generator matrix H' are chosen so that they correspond to the dimensions i where $M_i^- \leq \rho_i \leq M_i^+$.

These rows are ordered by increasing values of $\delta_i$ as defined above, namely the higher the distance the higher the order of the row. The search begins with dimensions exhibiting comparatively high distance values. For a given interval $[L_i^-, L_i^+]$, the lower $\delta_i$ the more likely the interval $[B_i^-, B_i^+]$ will have the same size as $[L_i^-, L_i^+]$. The dimensions exhibiting high passing rates (i.e. low selectivity) are therefore concentrated in the high levels of the tree.

The second and third ordering rules can be jointly used for sorting the dimensions, the last rows being those for which $\rho_i < M_i^-$ or $\rho_i > M_i^+$ and the first rows those for which $M_i^- \leq \rho_i \leq M_i^+$.

By applying the second and/or the third ordering rules, the search of the candidate points belonging to the intersection of the ellipsoid with the constellation is significantly accelerated. This point is illustrated in FIG. 6B showing a search tree according to the sphere decoding method of the invention. The application of the first or the second ordering rule leads here to the exchange of dimension 2M with dimension 2M−1, that is to an exchange of the last two rows of the generator matrix H'.

After said exchange, the search starts with the determination of the new interval $$[B_{2M}^-, B_{2M}^+].$$

As can be seen from FIG. 4, $$[L_{2M}^-, L_{2M}^+] = [3,5] \text{ and } [M_{2M}^-, M_{2M}^+] = [0,3],$$

hence $$[B_{2M}^-, B_{2M}^+] = \{3\}.$$

The component $b_{2M}$ can take only one value and therefore only one branch is to be explored.

For $b_{2M}=3$, we have $$[L_{2M-1}^-, L_{2M-1}^+] = [2,3]$$

and, therefore:

$$[B_{2M-1}^-, B_{2M-1}^+] = [L_{2M-1}^-, L_{2M-1}^+] \cap [M_{2M-1}^-, M_{2M-1}^+] = [2,3] \cap [0,3] = [2,3].$$

The two candidate points are found after having explored two nodes only (in comparison with 5 nodes in FIG. 6A).

According to a third variant, for each dimension, there is calculated the passing rate exhibited by the root of the tree if the search were to start with said dimension (i.e. when the row corresponding to this dimension were the last of the generator matrix). This passing rate is denoted $$\sigma_{2M}^j$$

and can be expressed as:

$$\sigma_{2M}^{j} = \frac{|B_{2M}^{+} - B_{2M}^{-}|}{2 \cdot \sqrt{C/q_{2M,2M}}} = \frac{\left|\min\left(\left[\sqrt{\frac{C}{q_{2M,2M}}} + \rho_{2M}\right], M_{2M}^{+}\right) - \max\left(\left[-\sqrt{\frac{C}{q_{2M,2M}}} + \rho_{2M}\right], M_{2M}^{-}\right)\right|}{2 \cdot \sqrt{C/q_{2M,2M}}} \quad (30)$$

The term $q_{2M,2M}$ appearing at the right-hand side of expression (30) is the coefficient appearing at the bottom right corner of the matrix $\Delta$. It depends on i because the matrix $\Delta$ is obtained here by Cholesky factorization of the generator matrix H' after it has been subjected to a row permutation to place the ith row at the bottom of the matrix.

The third variant uses a fourth ordering rule. According to this rule, the rows of the generator matrix are ordered by decreasing values of $\sigma_{2M}^{i}$, namely the row are permuted so that the lower the passing rate, the higher the order of the row. Hence, the search starts with the dimensions exhibiting comparatively low passing rates.

The third variant requiring 2M Cholesky factorizations, it is advantageous whet the number of transmit antennas is rather small.

Whatever the ordering rule is used, each reordering of the dimensions can be expressed as a permutation $\pi$ of the rows of the generator matrix H'. Once the closest point b of the product constellation to the received point $\rho$ has been found, the inverse permutation $\pi^{-1}$ is performed on the components of b and the estimated transmitted symbols are derived therefrom.

Figure 3A:
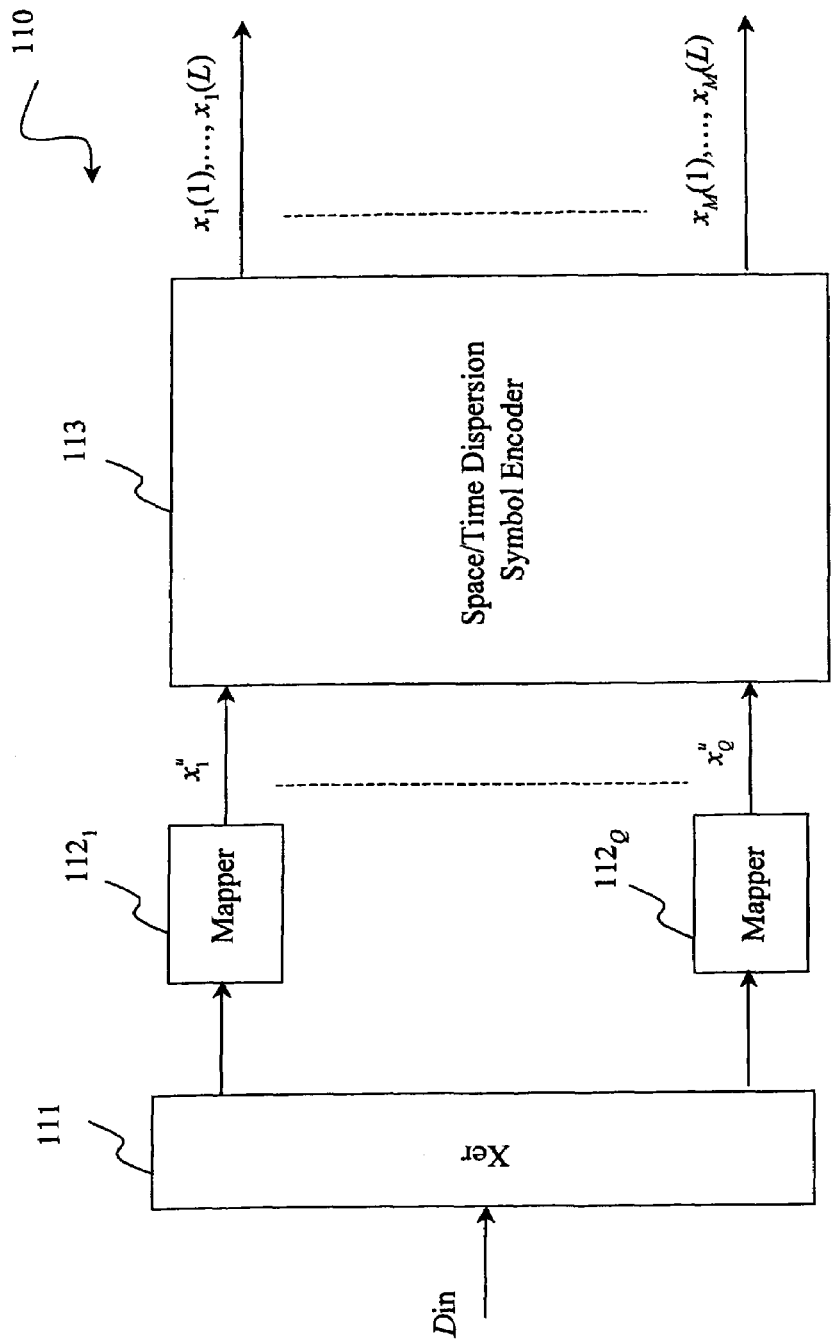
FIG. 3A represents schematically the structure of a space-time encoder for use in the transmitter of FIG. 1.
Figure 3B:
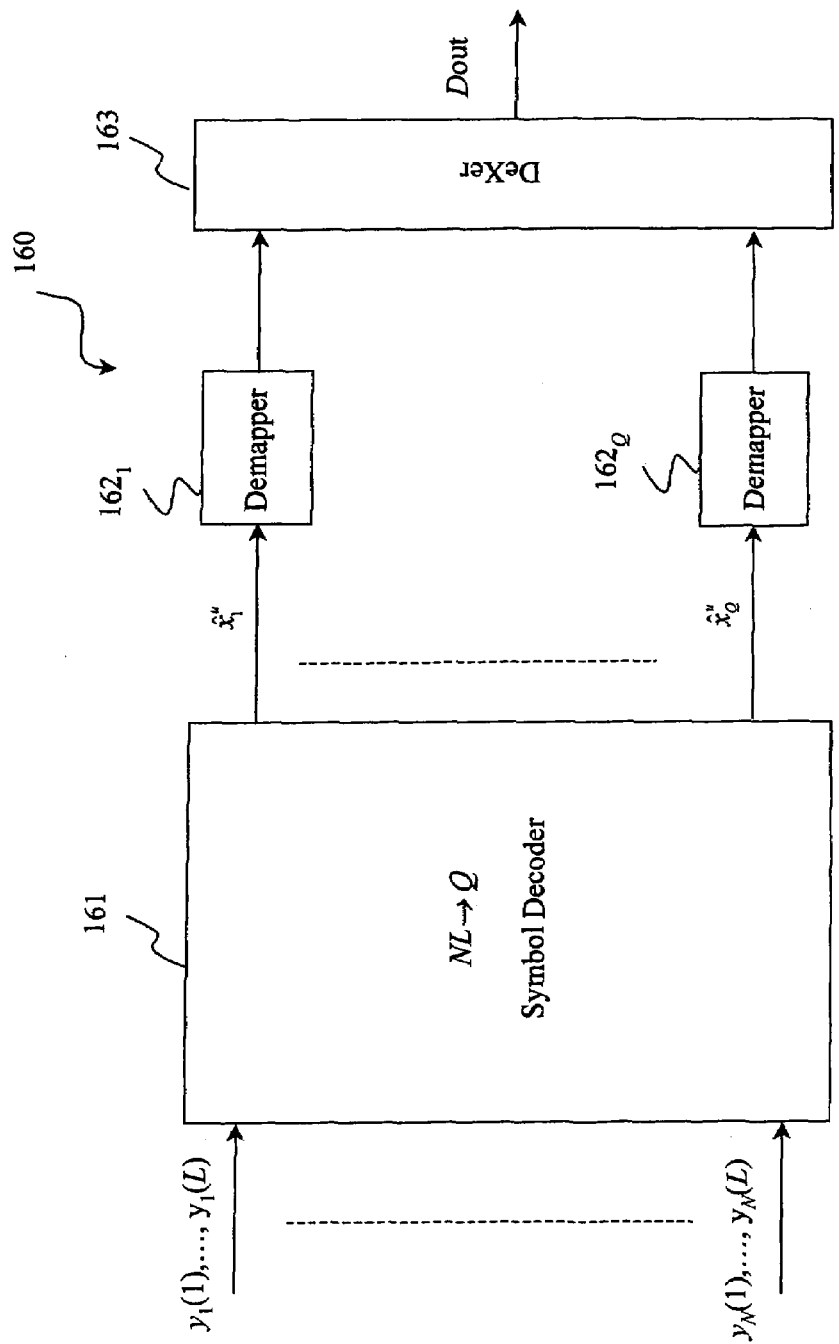
FIG. 3B represents schematically the structure of a detector for use in the receiver of FIG. 1.

The second embodiment of the invention proceeds along the same lines as the first embodiment, although at the expense of a change of dimensions (the block size Q replacing the number M of transmit antennas and the number of receive antennas being multiplied by the number L of timeslots) and a change of generator matrix, H'$_L$ instead of H' as explained in connection with FIGS. 3A and 3B. The dimensions of the lattice 2q−1 and 2q of the lattice bear respectively the real part and the imaginary part of the complex symbol $x_q^u$.

The product constellation $\Pi$ is generated here by the modulation constellations used for mapping the Q symbols $x_1^u, \ldots, x_Q^u$ respectively. The ordering rules described above operate on the rows of the matrix H'$_L$, that is on the real and imaginary parts of the symbols $x_1^u, \ldots, x_Q^u$. Here again, once the closest point of the product constellation to the receive point is found an inverse permutation is effected on the components thereof and the estimated symbols $\hat{x}_q^u$, q=1, . . . , Q are derived therefrom.

As it will be appreciated by the man skilled in the art, the invention can be used for estimating a plurality Q of symbols transmitted by a plurality M of transmitted antennas and received by a plurality of N received antennas, provided the vector of the received signals can be represented by a linear system of the type given in the expressions (3) or (27). In particular, the method of the invention could also apply, even if the space-time dispersion differs from the one indicated in (25), provided there exists a linear expression of the type given in (27).

The invention claimed is:

1. A method for estimating a plurality of symbols transmitted by a first plurality of transmit antennas at a given emission time or a plurality of symbols subjected to a space-time dispersion coding prior to transmission by said first plurality of transmit antennas over a second plurality of transmission times, the method using signals received by a third plurality of receive antennas, each symbol belonging to a modulation constellation, the method comprising:

forming a vector representative of said received signals at a reception time or at a second plurality of consecutive reception times; and searching the closest neighbour of said vector representative of said received signals at the reception time among candidate vectors belonging to a subset of points, representative of any combination of said possible symbols, determined by said modulation constellation of a lattice of points generated by a plurality of generating vectors, the search being limited to a volume around said vector and being carried out by sequentially selecting a coordinate of a candidate vector for each dimension of said lattice of points in a representation associated with said generating vectors, wherein the components of said vector are expressed in a reordered lattice of points obtained by reordering said generating vectors according to an ordering rule prior to said search, the ordering rule being chosen so as to eliminate a higher proportion of candidate vectors for a first dimension of the reordered lattice of points than for a subsequent dimension of the reordered lattice of points to be searched.

2. The method according to claim 1, further comprising:

for each dimension of the reordered laffice of points, determining a first interval representing a projection of said subset onto said dimension and, for a plurality of coordinates already selected if any, determining a second interval representing a portion of said volume along said dimension, the selection of a coordinate for said dimension being then limited to a third interval obtained as the intersection of said first and second intervals.

3. The method according to claim 2, further comprising:

for each dimension of the reordered lattice of points, calculating a value representative of a distance between the projection of the center of said volume onto said dimension and the middle of said first interval, normalised by the size of the latter, the ordering rule being such that any first dimension to be searched is associated with a higher normalised distance value than a value associated with any subsequent dimension to be searched.

4. The method according to claim 2, further comprising:

for each dimension of the reordered lattice of points, checking whether the projection of the center of said volume onto said dimension falls within said first interval and, if not, determining the value of the distance between said projection and the upper bound of said interval, if the former lies above the latter, or between said projection and the lower bound of said first interval, if the latter lies above the former, the ordering rule being such that any first dimension to be searched is associated with a higher value than a value associated with any subsequent dimension to be searched.

5. The method according to claim 2, further comprising:

for each dimension of the reordered lattice of points, checking whether the projection of the center of said volume onto said dimension falls within said first interval and, if so, determining the value of the distance between said projection and the middle of said interval, the ordering rule being such that any first dimension to be searched is associated with a higher value than a value associated with any subsequent dimension to be searched.

6. The method according to claim 2, wherein the projection of the center of said volume onto a first dimension falling outside said first interval representing the projection of said subset onto the first dimension and the projection of the center of said volume onto a second dimension falling within another first interval representing the projection of said subset onto the second dimension, the ordering rule being such that the first dimension is searched before said second dimension.

7. The method according to claim 2, further comprising:
for each dimension of the reordered lattice of points, determining a fourth interval representing the projection of said volume onto said dimension, obtaining a fifth interval as the intersection of said first and fourth intervals, and calculating a value representative of the ratio of the length of the fifth interval to the length of the fourth interval, the ordering rule being such that any first dimension to be searched is associated with a lower value than a value associated with any subsequent dimension to be searched.

8. The method according to claim 1, further comprising, once the closest neighbour has been found, reordering coordinates of the closest neighbor according to the inverse of said ordering rule, and deriving estimates of the plurality of said symbols from said reordered coordinates.

* * * * *